United States Patent [19]

Murai et al.

[11] Patent Number: 4,873,679
[45] Date of Patent: Oct. 10, 1989

[54] OPTICAL INFORMATION RECORDING DISK AND OPTICAL INFORMATION RECORDING DISK APPARATUS

[75] Inventors: Katsumi Murai, Kyoto; Makoto Usui, Suita, both of Japan

[73] Assignee: Matsushita Electric Industrial Co., Ltd., Osaka, Japan

[21] Appl. No.: 135,453

[22] Filed: Dec. 21, 1987

[30] Foreign Application Priority Data

Dec. 25, 1986 [JP] Japan .................................. 61-311358
Dec. 25, 1986 [JP] Japan .................................. 61-311359
Dec. 25, 1986 [JP] Japan .................................. 61-311360

[51] Int. Cl.⁴ .............................................. G11B 7/007
[52] U.S. Cl. ........................................ 369/32; 360/48;
360/51; 369/44; 369/50; 369/93; 369/284
[58] Field of Search ................... 369/32, 44, 50, 284,
369/286, 93; 360/51, 48

[56] References Cited

U.S. PATENT DOCUMENTS

| | | | |
|---|---|---|---|
| 4,357,635 | 11/1982 | Hasegawa | 360/51 |
| 4,641,294 | 2/1987 | Yoshimaru | |
| 4,789,975 | 12/1988 | Taniyama | 369/44 |
| 4,799,112 | 1/1989 | Bremmer et al. | 360/51 |

FOREIGN PATENT DOCUMENTS

| | | |
|---|---|---|
| 10164061 | 12/1985 | European Pat. Off. |
| 10177737 | 4/1986 | European Pat. Off. |
| 20176755 | 4/1986 | European Pat. Off. |
| 10199425 | 10/1986 | European Pat. Off. |
| 57-111811 | 7/1982 | Japan |
| 58-175142 | 10/1983 | Japan |

*Primary Examiner*—Steven L. Stephan
*Attorney, Agent, or Firm*—Stevens, Davis, Miller & Mosher

[57] ABSTRACT

An optical information recording disk and optical information recording disk apparatus which increase the recording capacity of data recorded on the disk, and are capable of fast recording and reproduction. Logical tracks are arranged by sequentially merging physical tracks starting at the inner portion of the disk and physical tracks starting at the outer portion, and the number of sectors on corresponding tracks recorded at a constant linear density is invariably constant on the basis of the relation of arithmetical series. Consequently, the inventive system, despite of the MCAV system of constant disk speed, achieves track access and fast data transfer comparable with the conventional CAV system.

6 Claims, 9 Drawing Sheets

OPTICAL INFORMATION RECORDING DISK AND OPTICAL INFORMATION RECORDING DISK APPARATUS

BACKGROUND OF THE INVENTION

Recently, optical information recording disks are attracting attention as mass capacity information media, although they are not of as large capacity as magnetic tapes. In order for the optical information recording disk to have an increased recording capacity, it often adopts a recording system which records with a constant recording density called a "CLV" (constant linear velocity) system. However, to be applied to information files, that are primarily accessed at random, the disk speed needs to be changed for each access and this results in a slower access time. Because of this, for computer related applications, in which access ability is a crucial performance factor, the "CAV" (constant angular velocity) system is generally adopted. Recently, attempts have been made to achieve both of the virtually constant recording density and fast access by changing the information recording rate while maintaining a constant disk speed. This system is called a "MCAV" (modified constant angular velocity) system. The optical information recording disk and optical information recording disk apparatus based on the above-mentioned conventional MCAV system will be described with reference to the drawings.

FIG. 9 shows the recording surface of the optical information recording disk based on the conventional MCAV system. In the figure, indicated by 66 is an optical guide groove for track 0 sector 0 on the optical information recording disk. Indicated by 67 is an address information recording section in the form of a small pit for track 0 sector 0, in which section are recorded address information including a sector mark, synchronizing VFO signal and track information, and information such as an error check code for the,, address information, all recorded at the time of manufacture of the master disk for the optical information recording disk. Indicated by 68, 69, 70, 71, 72 and 73 are information recording sections for track 0 sector 1, track 0 sector 9, track 1 sector 0, track 1 sector 10, track 2 sector 0, and track 2 sector 6, respectively. Indicated by 74, 75 and 76 are address information sections for track 6 sector 4, track 8 sector 5, and track 9 sector 13. The operation of the optical information recording disk arranged as described above is an follows.

A region extending from an information recording region 66 following the address information recording section 67 for track 0 sector 0 to an information recording region following the address information recording section 73 for track 2 sector 6, and a region extending from an information recording region following the address information recording section 74 for track 8 sector 4 to an information recording region following the address information recording section 76 for track 9 sector 13 have records of different image data of the same number of pixels, and each of these regions occupies 28 sectors. Although these data are recorded dividedly in sectors with a certain information capacity for control or management convenience, they occupy different numbers of tracks due to different numbers of division for compensating the different circumferential lengths at inner and outer portions while maintaining a virtually constant linear density. The worst data transfer rate through recording and reproduction is equivalently 10 sectors per disk revolution, and it is determined by the transfer rate of the innermost track.

Next, the operation of the optical information recording disk apparatus will be described.

FIG. 10 shows a conventional MCAV optical information recording disk apparatus. In the figure, indicated by 38 is a double-sided optical information disk, 39 is an optical head, 41 is a disk spindle motor, 46 is a binary threshold circuit, 48 is an optical head drive control circuit, 50 is an address information detecting circuit, 52 is a PLL circuit, 54 is an error correcting circuit, 56 is a buffer memory circuit, 58 is a laser drive circuit, and 60 is a control microcomputer. The control microcomputer, which implements head tracking on any desired track on the optical information recording disk 38, operates on the optical head drive circuit 48 to have a seek operation for the optical head 39 to the desired target track so that address information read out by the binary threshold circuit 46 and address information detecting circuit 50 matches the desired address. In recording, binary information from the host computer is stored in necessary quantity in a buffer memory 56, and, after being appended with error correcting codes by an error correcting circuit 54, it is written onto the optical information disk 38 by the laser drive circuit 58. In reproduction, a synthesized oscillator in the PLL circuit 52 is set up in advance by the control computer 60 to oscillate the comparing source oscillation frequency corresponding to the target track, and recorded information which was made binary by the binary threshold circuit 46 is read out in response to the reproduction clock produced by the PLL circuit and which frequency is compared with the source oscillation frequency, and, after being rendered error correction by the error correcting circuit 54, it is sent to the buffer memory circuit 56. The data in the buffer memory is then sent to the host computer. The data transfer rate from the host computer at recording or to the host computer at reproduction is in quantity equivalent to 18 sectors per disk revolution at the outermost portion and 10 sectors at the innermost portion. The conventional MCAV optical information recording disk is constant in revolution and, although the concept of "1 track" exists, it has different recording capacities at an inner portion and outer portion, and therefore the number of tracks cannot be correspondent to a certain quantity of information data and, in addition, the maximum information transfer rate is determined by the worst transfer rate of the innermost portion.

However, the foregoing arrangement does not allow the construction of computer systems using the concept of tracks and sectors generally used in digital information recording media, and it requires a correspondence to be made by computation between logical sectors and physical sectors using conversion tables or the like. In general, this computation is intricate and needs accumulation of track numbers with different numbers of sectors starting at the innermost track, and it becomes almost meaningless to record the same track number as a conventional one in the address information on the optical information recording disk.

However, in order to speed up operations such as calculating the number of tracks to be jumped while reading the track address information so as to meet the requirement of faster access on the optical information recording disk, the physical and logical tracks are desirably consistent. Therefore, the conventional arrangement has problems in software overhead to cope with the above matter and increased hardware components for the conversion table. Even though a fast, mass data transfer for digital video data might be accomplished using the outermost portion, the worst transfer rate in the innermost portion negates any improvement over the CAV system. In contrast, the ordinary CLV system successfully overcomes the problem of transfer, however, it necessitates a very high disk revolving speed for recording the innermost portion, creating mechanical problems of vibration and increased access time due to the inertia to follow the disk speed which varies at each access operation.

SUMMARY OF THE INVENTION

In view of the foregoing situation, the present invention is intended to provide an optical information recording disk and optical information recording disk apparatus operative based on the concept of "tracks" and "sectors" on the recording medium as in the conventional CAV (constant angular velocity) system without sacrificing the fast-access and mass-storage capabilities of the MCAV recording system, and operative in unison with conventional computers. The invention is also intended to realize fast data transfer.

The inventive optical information recording disk has first information recording sections provided in a constant angular integral on spiral tracks arranged dividedly in equal number in an inner and outer portions on one side of a recording disk or on spiral tracks arranged in equal number on both sides of a recording disk, partitioned information sections divided from part or all of the first information recording sections with the length of each partitioned section being longer than a certain predetermined length and with the number of divisions per first information recording section being determined depending on the radius of track so as to have a maximum number of divisions, and address information sections on the spiral tracks for identifying the information recording position. Information is recorded on spiral tracks in the inner portion in the order from inside to outside, and information is recorded on spiral tracks in the outer portion, which have the different or opposite spiral direction from that in the inner portion, in the order from outside to inside. Alternatively, information is recorded on spiral tracks from inside to outside on a first surface and information is recorded on spiral tracks on a second surface, which have the same spiral direction as the first surface, in the order from outside to inside, and a series of information is record dividedly with the correspondence being made between the first information recording sections of a specific inner track and a specific outer track, with the specific tracks being confined to have such relation that total number of divisions per first information recording section of the inner and outer portions is equal to the total of the number of divisions of the innermost first information recording section and the number of divisions of the outermost first information recording section.

The inventive optical information recording disk apparatus includes an optical information recording disk having address information sections on tracks for identifying the information recording position and first information recording sections provided in a constant angular interval on tracks, and partitioned information sections divided from part or all of the first information recording sections, with their length being longer than a predetermined length and with their number of divisions per information recording section being determined depending on the radius of track so as to have a maximum number of divisions, at least one pair of heads for writing or reading information on the optical information recording disk, means of converting information, which has been read out of the optical information recording disk, into binary, a buffer memory for storing the binary information to be written or read on the recording disk by the heads, means of rotating the optical information recording disk at a constant angular velocity, means of identifying address information, and means of recording information in a constant quantity per partitioned information section. In operation, the pair of heads makes access to different tracks, with a sum M+N of numbers of divisions of the first information recording sections being a constant value, at recording, binary information to be recorded in quantity equivalent to the sum of divisions M+N is written into the buffer memory at each certain angular revolution of the disk and, thereafter the binary information is read out of the buffer memory and supplied to the partitioned information sections distributively for the head pair depending on division numbers M and N, and, at reproduction, information picked up by the pair of heads is binary-digitized and written in the buffer memory, and the binary information in quantity equivalent to the sum of division numbers M+N is read out of the buffer memory at every certain angular revolution of the optical information recording disk.

DESCRIPTION OF THE PREFERRED EMBODIMENTS

Figure 1:
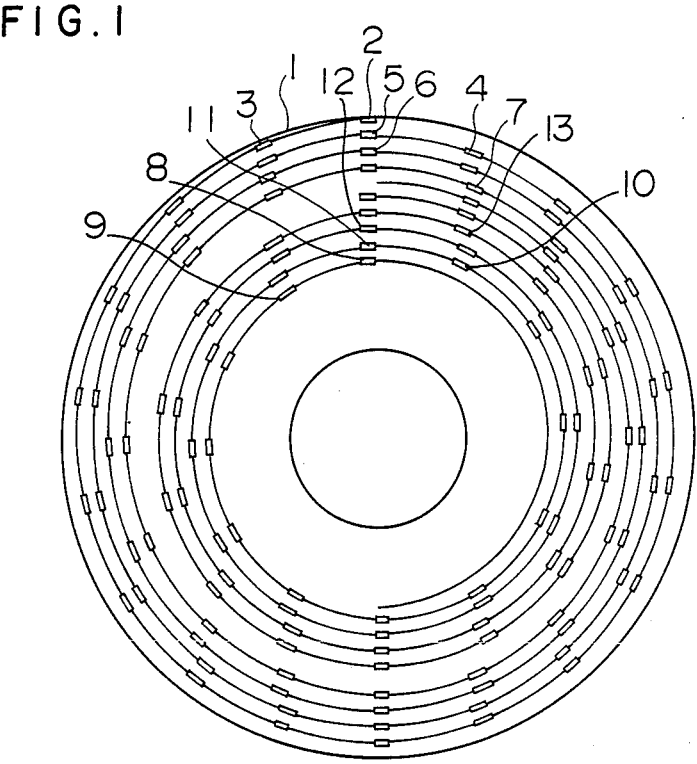
FIG. 1 is a plan view of the optical information recording disk according to the first embodiment of this invention.
Figure 2A:
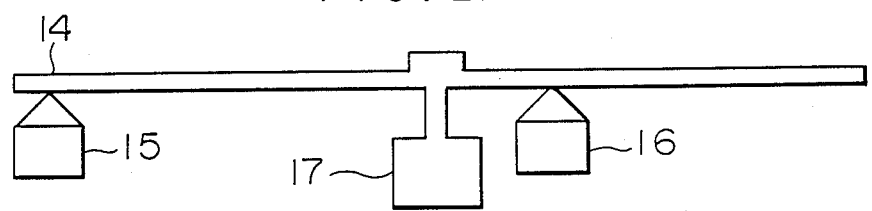
FIGS. 2A and 2B are front views of the first embodiment, showing the states of access to track 0 and track 4.
Figure 2B:
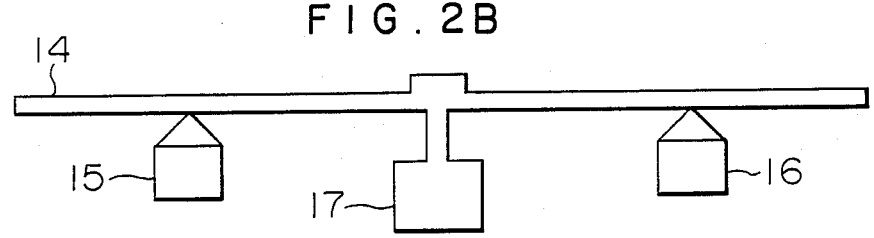

The optical information recording disk embodying the present invention will be described with reference to the drawings. FIG. 1 shows the concept of recording state on the optical information recording disk according to the first embodiment of this invention, and FIGS. 2A and 2B the states of access to information tracks according to the first embodiment of the invention. In FIG. 1, indicated by 1 is an optical guide groove for the outermost track 0 sector 0 on the recording surface of the optical information recording disk. 2 is an address information recording section in the form of small pits for the outermost track 0 sector 0, and it has a record of address information including track information and information such as an error check code for the address information, all record at the time of manufacture of the master disk for the optical information recording disk. Indicated by 3, 4, 5, 6 and 7 are address information recording sections for track 0 sector 1, track 0 sector 17, track 1 sector 0, track 2 sector 0, and track 2 sector 15, respectively. Indicated by 8, 9, 10, 11, 12 and 13 are address information recording sections for the innermost track 0 sector 18, track 0 sector 19, track 0 sector 29, track 1 sector 18, track 2 sector 16, and track 2 sector 29, respectively. In FIGS. 2A and 2B, indicated by 14 is the optical information recording disk, 15 and 16 are optical heads, and 17 is a disk spindle motor.

The operation of the optical information recording disk arranged as described above will be explained in connection with FIGS. 1, 2A and 2B. The optical recording disk of this embodiment has its number of sectors per track increasing by two at each shift of two track positions from inner toward outer tracks. This is the MCAV system and even increasing the number of divisions along the way from inner to outer tracks, if the length of division exceeds a certain length which is set for the innermost track, the number of divisions is increased so that the recording line density is virtually kept constant. Each track on the optical recording disk is split into two parts, and it means for the split semicircular tracks that the number of sectors increases by one as the track position shift from inner toward outer tracks. On the optical information recording disk of this embodiment, tracks given the same number exist in the inner and outer portions. Recording video data for a piece or one scene of digital picture occupies all of 30 sectors on track 0, i.e., from track 0 sector 0 (indicated by 1) following the outer peripheral address recording section 2 up to track 0 sector 17 following the address information recording section 4, and from track 0 sector 18 following the inner address information recording section 8 up to track 0 sector 29 following the address information recording section 10. Similarly, recording the same image information on track 1 will occupy the entirety of track 1. Accordingly, any track has a total of 30 sectors in the inner and outer portions. In this way, from the state of access to the outermost track in the outer portion and innermost track in the inner portion shown in FIG. 2A, the image data is recorded up to respective intermediate tracks shown in FIG. 2B.

Figure 3:
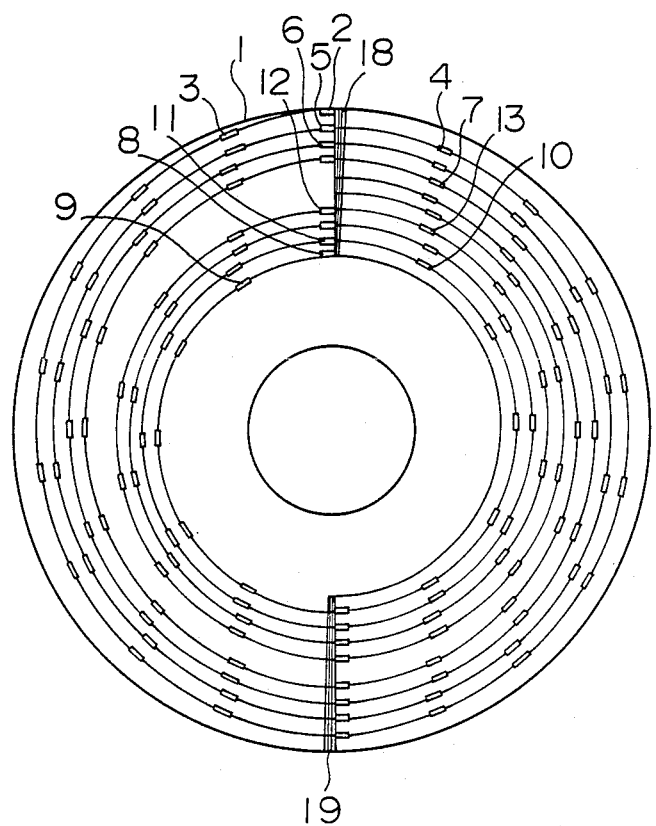
FIG. 3 is a plan view of the optical information recording disk according to the second embodiment of the invention.

Next, the second embodiment of this invention will be described with reference to the drawings. FIG. 3 shows the concept of recording state on the optical information recording disk according to the second embodiment of this invention. In FIG. 3, indicated by 1 is an optical guide groove for the outermost track 0 sector 0 on the recording surface of the optical recording disk. Indicated by 2, 3, 4, 5, 6 and 7 are address information recording sections for the outermost track 0 sector 0, track 0 sector 1, track 0 sector 17, track 1 sector 0, track 2 sector 0, and track 2 sector 15, respectively. Indicated by 8, 9, 10, 11, 12 and 13 are address information recording sections for the innermost track 0 sector 18, track 0 sector 19, track 0 sector 29, track 1 sector 18, track 2 sector 16, and track 2 sector 29, respectively. The above arrangement is basically identical to that of FIG. 1. Indicated by 18 and 19 are address information recording sections in which are recorded track numbers, numbers 0 and 1 for the following two semicircular information recording sections on each track and synchronizing marks recorded in PE modulation of constant recording density per angle, different from the modulation method for the above-mentioned two address information recording sections.

The operation of the optical information recording disk arranged as described above will be explained in connection with FIG. 3. The optical information recording disk of this embodiment has its number of sections per track increasing by two in each shift of two tracks from inner to outer tracks. This is the MCAV system, having the same track arrangement as FIG. 1. Each track on the recording disk surface is split into two parts, and the split semicircular tracks are arranged following the address information recording sections 18 and 19. This means for half tracks that the number of sectors increases by one at each shift of track position from inner to outer tracks, and correspondence can be made between half tracks starting at the outer position of outer portion and half tracks starting at the inner position of inner portion as the number of tracks increases. This correspondent arrangement for each track is basically the same as the embodiment of FIG. 1. An agreeable scheme of fast access on the optical information recording disk is to know the address information of the target track and access to the track while controlling by counting the number of tracks to pass thereacross. However, in a MCAV system, the clock used to read the address information varies depending on the track position, and therefore it is difficult to read the address information during the access. In contrast, recording address information at invariable positions and in CAV system, as in this embodiment, facilitates the reading of track address, resulting in a faster access capability.

Figure 4A:
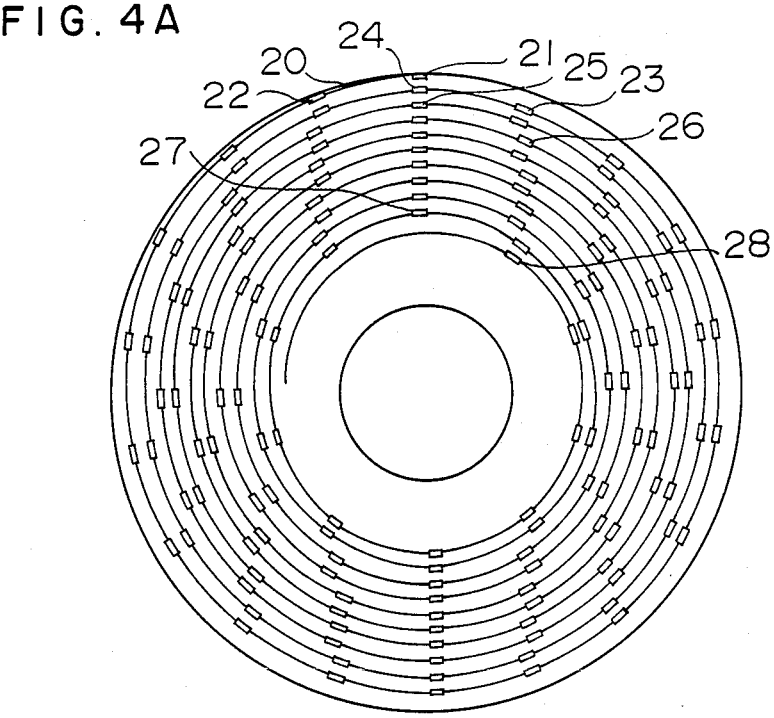
FIG. 4A is a plan view showing the first disk surface of the optical information recording disk according to the third embodiment of the invention.
Figure 4B:
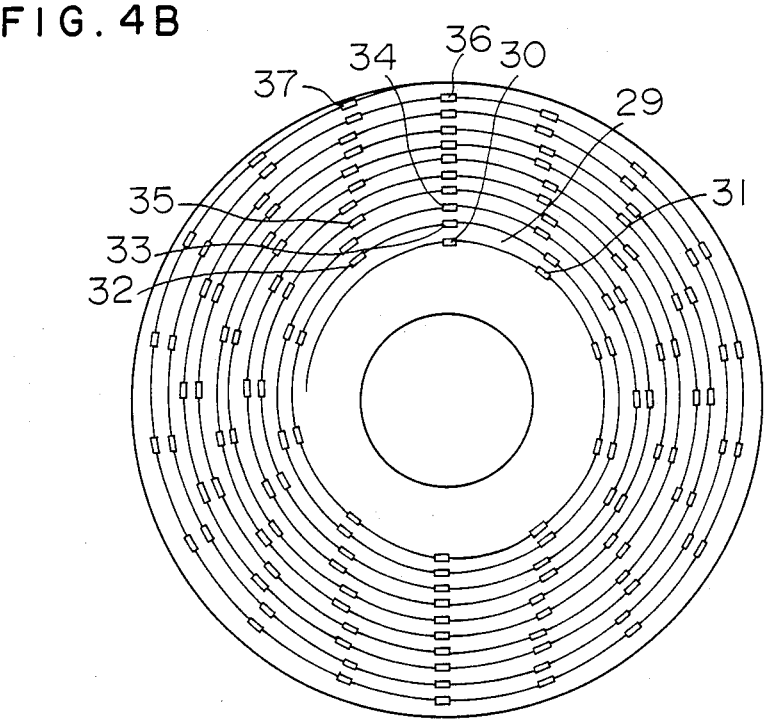
FIG. 4B is a plan view showing the second surface of the disk according to the third embodiment of the invention.
Figure 5A:
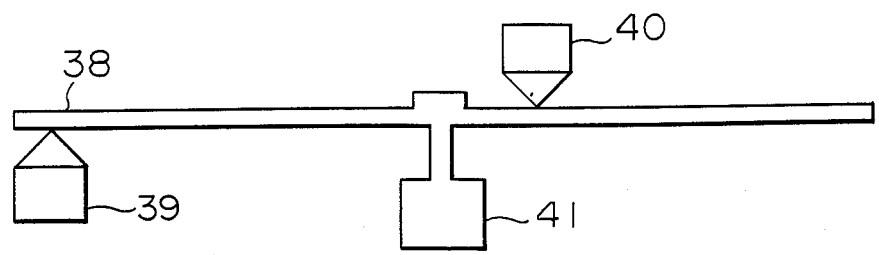
FIGS. 5A and 5B are front views showing the states of access to track 0 and track 9 according to the third and fifth embodiments of the invention.
Figure 5B:
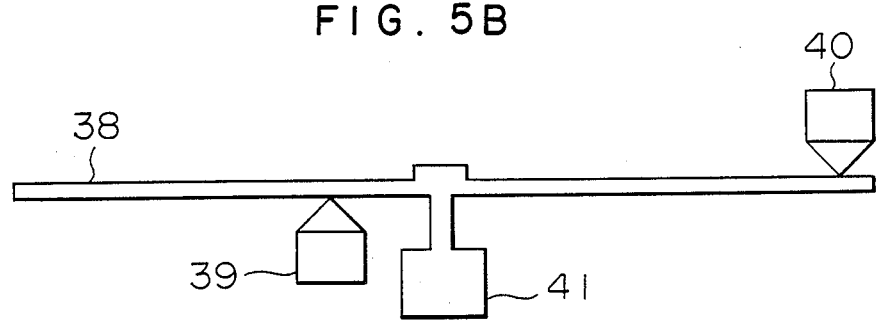

FIGS. 4A and 4B show the concept of a recording state of the optical information recording disk according to the third embodiment of this invention, and FIGS. 5A and 5B are diagrams showing the track access states according to this embodiment. In FIG. 4A, indicated by 20 is an optical guide groove for the outermost track 0 sector 0 on side 1 of the double-sided optical information recording disk. Indicated by 21 is an address information recording section in the form of small pits for the outermost track 0 sector 0, and it has a record of address information including track information and information such as an error check code for the address information, all recorded at the time of manufacture of the master disk for the optical information recording disk. Indicated by 22, 23, 24, 25 and 26 are address information recording sections for the outermost track 0 sector 1, track 0 sector 17, track 1 sector 0, track 2 sector 0, and track 2 sector 15, respectively. Indicated by 27 and 28 are address information recording sections for the innermost track 9 sector 0, and track 9 sector 9, respectively. In FIG. 4B, 29 is an optical guide groove for the innermost track 0 sector 18 on side 2 of the double-sided optical disk. 30 is an address information recording section for the innermost track 0 sector 18 which was recorded at the time of manufacture of the master disk, as for side 1. Indicated by 31, 32, 33, 34 and 35 are address information recording sections for track 0 sector 19, track 0 sector 27, track 1 sector 18, track 2 sector 16, and track 2 sector 27, respectively. Indicated by 36 and 37 are address information recording sections for the outermost track 9 sector 10 and track 9 sector 27, respectively. In FIGS. 5A and 5B, indicated by 38 is the optical information recording disk, 39 and 40 are optical heads, and 41 is a disk spindle motor.

The operation of the optical information recording disk arranged as described above will be explained in connection with FIGS. 4A, 4B, 5A and 5B.

The optical recording disk of this embodiment has its number of sectors per track increasing by two at each shift of two track positions from inner toward outer tracks. This is the MCAV system, and even in increasing the number of divisions along the way from inner to outer tracks if the length of division exceeds a certain length which is set for the innermost track, the number of divisions is increased so that the line recording density is virtually kept constant. Each track on side 1 and side 2 of the optical information recording disk is split into two parts, and it means for the split semicircular tracks that the number, of sectors increases by one as the track position shifts from inner toward outer tracks. On the optical information recording disk of this embodiment, tracks given the same number exist on both the side 1 and side 2. Recording video data for a piece of digital picture occupies all of 28 sectors on track 0, i.e., from track 0 sector 0 (indicated by 20) following the address recording section 21 up to track 0 sector 17 following the address information recording section 23, and from track 0 sector 18 following the address information recording section 30 on side 2 up to track 0 sector 27 following the address information recording section 32. Similarly, recording the same image information on track 1 will occupy the entirety of track 1. Accordingly, any track has a total of 28 sectors on side 1 and side 2. In this way, image data is recorded from the state of access to track 0 on side 1 shown in FIG. 5A up to the state of access to track 9 shown in FIG. 5B.

Figure 6A:
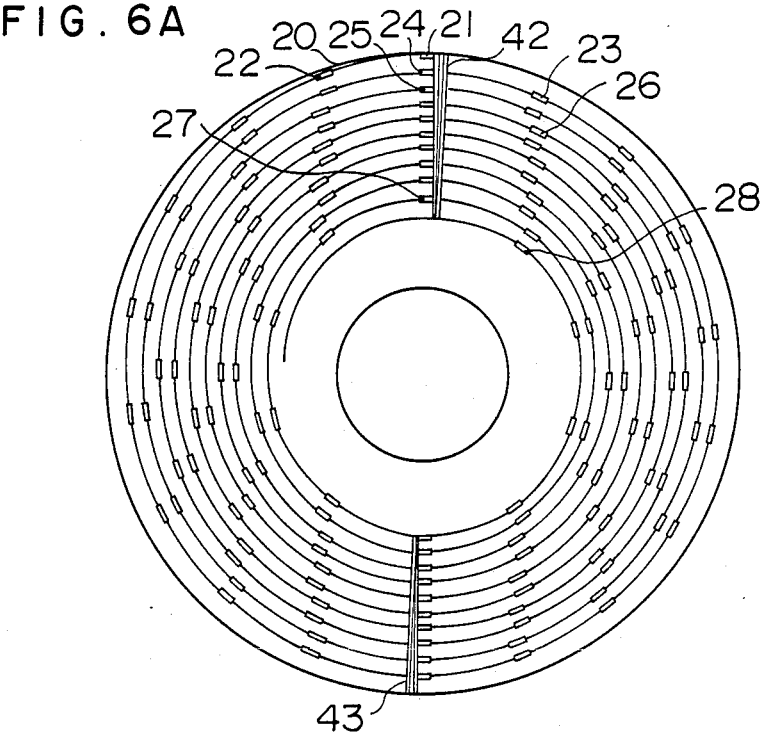
FIG. 6A is a plan view showing the first disk surface of the optical information recording disk according to the fourth embodiment of the invention.
Figure 6B:
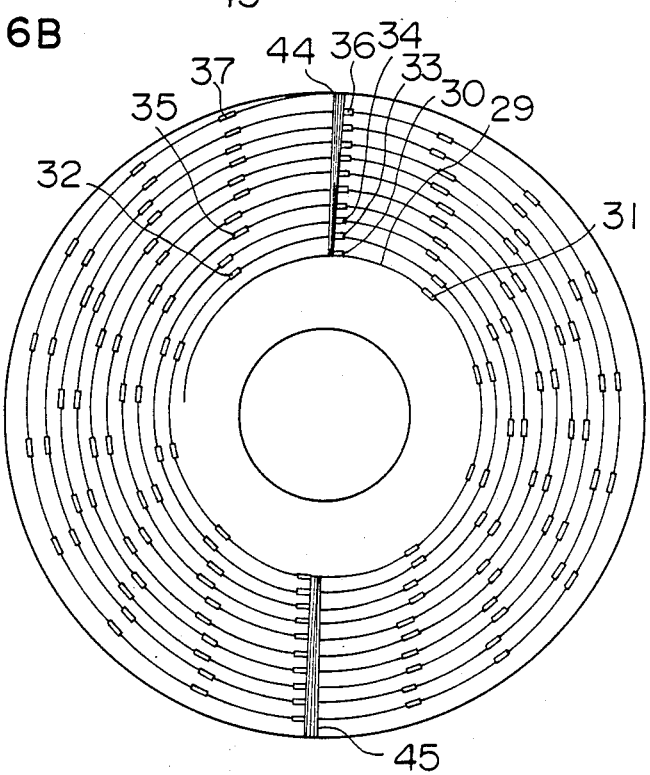
FIG. 6B is a plan view showing the second surface of the disk according to the fourth embodiment.

Next, the fourth embodiment of this invention will be described with reference to the drawings. FIGS. 6A and 6B show the concept of a recording state on the optical recording disk according to the fourth embodiment of this invention. In FIG. 6A, indicated by 20 is an optical guide groove for the outermost track 0 sector 0 on side 1 of the double-sided optical disk. Indicated by 21, 22, 23, 24, 25 and 26 are address information recording sections for the outermost track 0 sector 0, track 0 sector 1, track 0 sector 17, track 1 sector 0, track 2 sector 0, and track 2 sector 15, respectively. Indicated by 27 and 28 are address information recording sections for the innermost track 9 sector 0, and track 9 sector 9, respectively. The arrangement is basically identical to that of FIG. 4. Indicated by 42 and 43 are address information recording sections in which are recorded track numbers, numbers 0 and 1 for the following two semicircular information recording sections on each track and synchronizing marks recorded in PE modulation of constant recording density per angle, different from the modulation method for the above-mentioned address information recording sections 21.

In FIG. 6B, 29 is an optical guide groove for the innermost track 0 sector 18 on side 2 of the double-sided optical disk. Indicated by 30, 31, 32, 33, 34 and 35 are address information recording sections for the outermost track 0 sector 18, track 0 sector 19, track 0 sector 27, track 1 sector 18, track 2 sector 17, and track 2 sector 27, respectively. Indicated by 36 and 37 are address information recording sections for the outermost track 9 sector 10, and track 9 sector 27, respectively. Indicated by 44 and 45 are address information recording sections in which are recorded track numbers, numbers 0 and 1 for the following two semicircular information recording sections on each track and synchronizing marks recorded in PE modulation of constant recording density per angle, different from the modulation method for the above-mentioned address information recording sections 30.

The operation of the optical information recording disk arranged as described above will be explained in connection with FIGS. 6A and 6B. The optical recording disk of this embodiment has its number of sectors per track increasing by two at each shift of two tracks from inner toward outer tracks. This is the MCAV system, having the same track arrangement as FIG. 4. Each track on side 1 and side 2 of the disk is split into two parts, and the split semicircular tracks are arranged following the address information recording sections 42, 43, 44 and 45. This means for half tracks that the number of sectors increases by one at each shift of position from inner toward outer tracks, and a correspondence can be made between half tracks starting at the outer peripheral position of side 1 and half tracks starting at the inner peripheral position of side 2 as the number of tracks increases. This correspondent arrangement for each track is basically the same as the third embodiment. An agreeable scheme of fast access on the optical information recording disk is to know the address information of the target track and access to the track while controlling by counting the number of tracks to pass thereacross. However, in MCAV system, the clock used to read the address information varies depending on the track position, and therefore it is difficult to read the address information during the access. In contrast, recording of address information at invariable positions and yet according to the CAV system, as in this embodiment, facilitates the reading of track address, resulting in a faster access capability. Each semicircular track on side 1 and side 2 has a total of 28 sectors, and this is substantially equal to the transfer rate at an intermediate track position on the optical information recording medium. It enables faster data transfer as compared with the CAV system, and is suitable for recording and reproducing digital video pictures.

Figure 7:
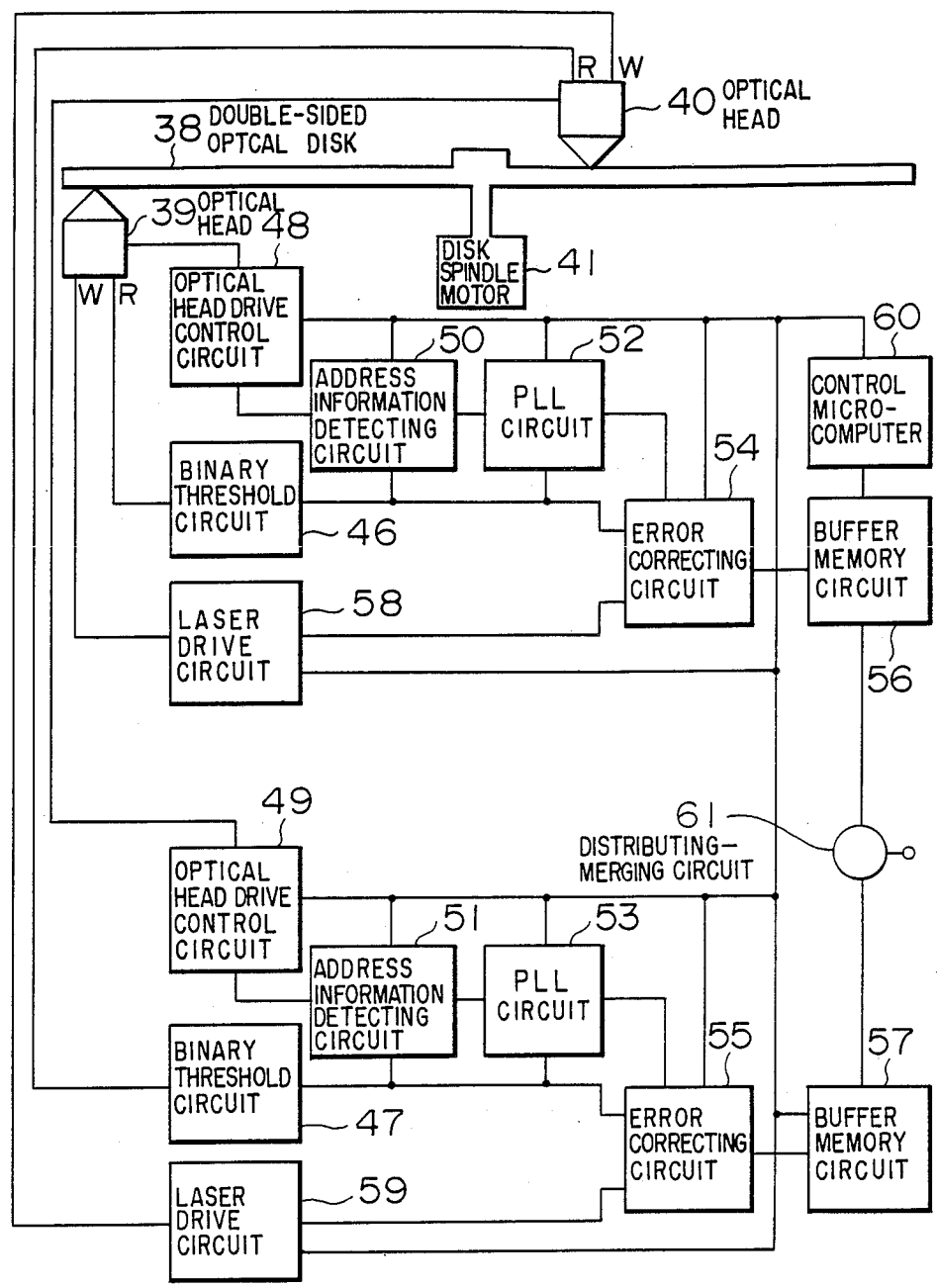
FIG. 7 is a block diagram of the optical information recording disk apparatus according to the fifth embodiment of the invention.

FIG. 7 is a block diagram of the optical information recording apparatus which is the fifth embodiment of this invention. Shown in FIG. 7 by 38 is a double-sided optical information recording disk, 39 and 40 are optical heads, 41 is a disk spindle motor, 46 and 47 are binary threshold circuits, 48 and 49 are optical head drive control circuits, 50 and 51 are address information detecting circuits, 52 and 53 are PLL circuits, 54 and 55 are error correcting circuits, 56 and 57 are buffer memories, 58 and 59 are laser drive circuits, 60 is a control microcomputer, and 61 is a distributing-merging circuit. FIGS. 5A and 5B are diagrams showing the scene of track access according to the fifth embodiment of this invention. In the figure, indicated by 39 and 40 are optical heads, and 41 is a disk spindle motor.

The operation of the optical information recording disk apparatus arranged as described above will be explained in connection with FIGS. 7, 5A and 5B.

The optical recording disk of this embodiment has its number of sectors per track increasing by one at each shift of one track position from inner toward outer tracks. This is the MCAV system, having a constant recording density per sector by increasing the sector length along the way from inner toward outer tracks, and if the length of divided sectors exceeds a certain length determined for the innermost track despite an increased number of divisions at the circumference, the number of divisions is further increased so that the line recording density of each sector is substantially constant. It is assumed that such a recording surface exists on both of side 1 and side 2 of the optical information recording disk, and the innermost and outermost portions include 10 sectors and 18 sectors, respectively. In recording image data for a piece or one scene of digital picture having an equivalent capacity of 28 sectors onto the optical information recording disk, it occupies a total of 28-sector area by being recorded dividedly on the innermost track on side 1 and outermost track on side 2. Similarly, when the same image information is recorded on the track next to the innermost track and the track next to the outermost track, it occupies 11 sectors and 17 sectors on these tracks or a total of 28 sectors. When correspondence is made between tracks on side 1 and tracks on side 2 sequentially, an arbitrary track always has a total of 28 sectors on side 1 and side 2, and it invariably meets the relation of constant number of sectors based on the formula of arithmetical series.

For the tracking to arbitrary target track on the optical information recording disk 38, the control microcomputer 60 operates on the optical head drive circuits 48 and 49 to have a seek operation for the optical heads 39 and 40 so that the address information read out by the binary threshold circuits 46 and 47 and address information detecting circuits 50 and 51 becomes equal to the specific address. At recording, binary information sent from the host computer by way of the distributing-merging circuit 61 is distributed to the buffer memories 56 and 57 in quantities proportional to the numbers of sectors on the respective tracks, and, after being appended with error correcting codes by the error correcting circuits 54 and 55, the information is recorded on the optical information recording disk 38 by the laser drivers 58 and 59. At reproduction, the control computer 60 sets up in advance the synthesized oscillators within tee PLL circuits 52 and 53 so that they oscillate comparing source oscillation frequencies corresponding to the target track addresses, and reads out the recorded information which has been quantized in binary by the binary threshold circuits 46 and 47 using the source oscillation frequencies and the reproduction clock produced by the PLL circuits, and, after the correcting process by the error correcting circuits 54 and 55, sends the information to the buffer memories 56 and 57. The data from the buffer memories are merged by the distributing-merging circuit 61, and sent to the host computer. The data transfer rate from the host computer at recording and to the host computer at reproduction is equivalently 28 sectors per disk revolution. Shown in FIGS. 5A and 5B are head positions after the optical heads 39 and 40 had started access to respective sectors (FIG. 5A), and when the heads have completed recording of a total of 10 pieces of image data on the entire surfaces of the optical recording disk (FIG. 5B).

Figure 8:
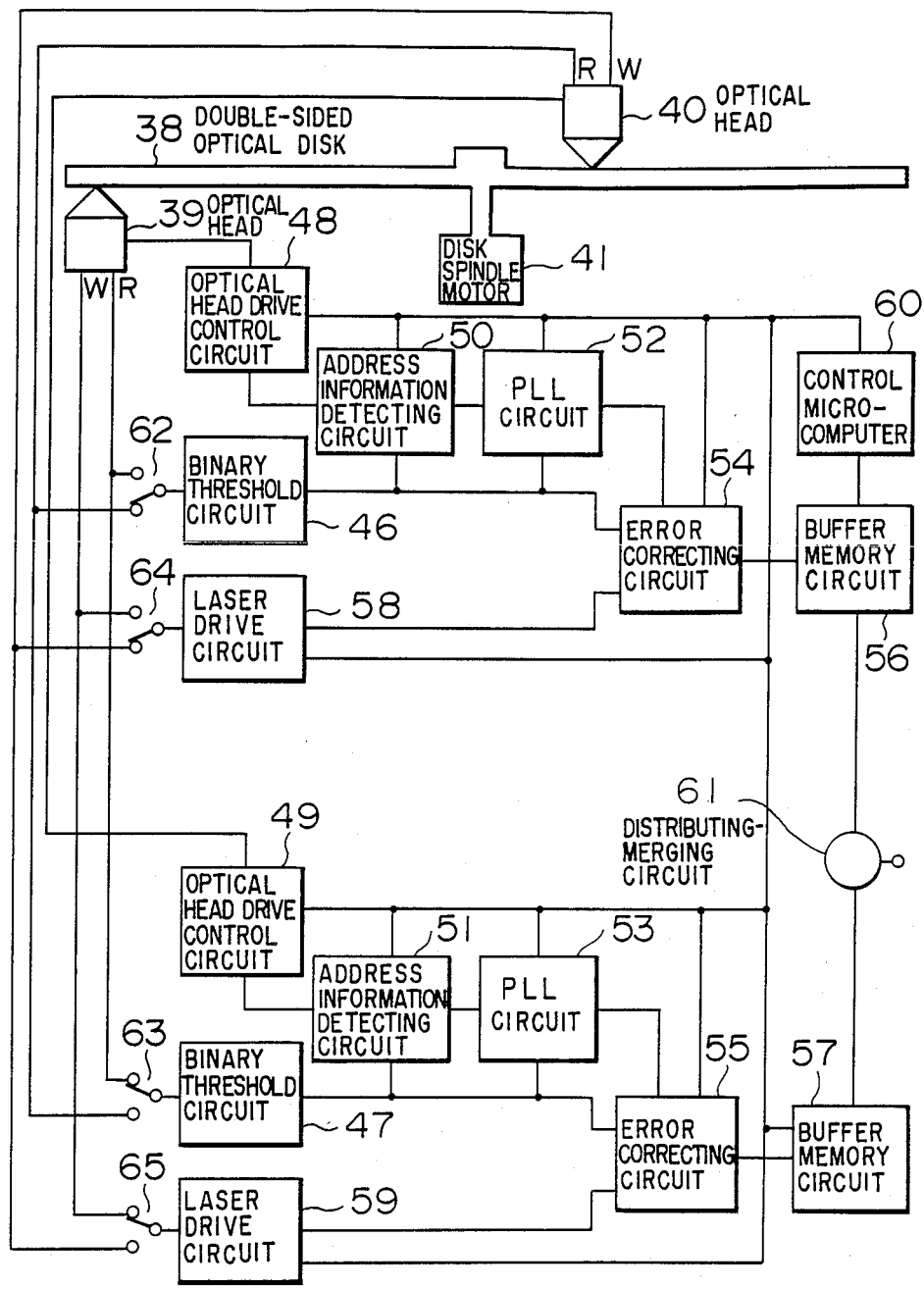
FIG. 8 is a block diagram of the optical information recording disk apparatus according to the sixth embodiment of the invention.
Figure 9:
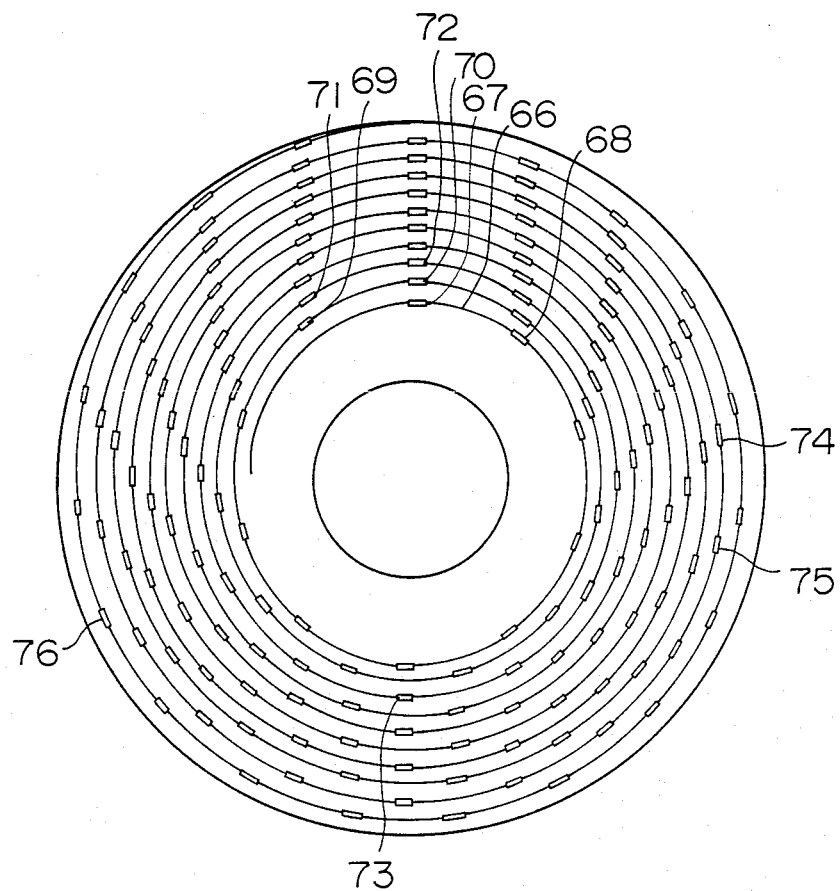
FIG. 9 is a plan view of the conventional optical information recording disk.
Figure 10:
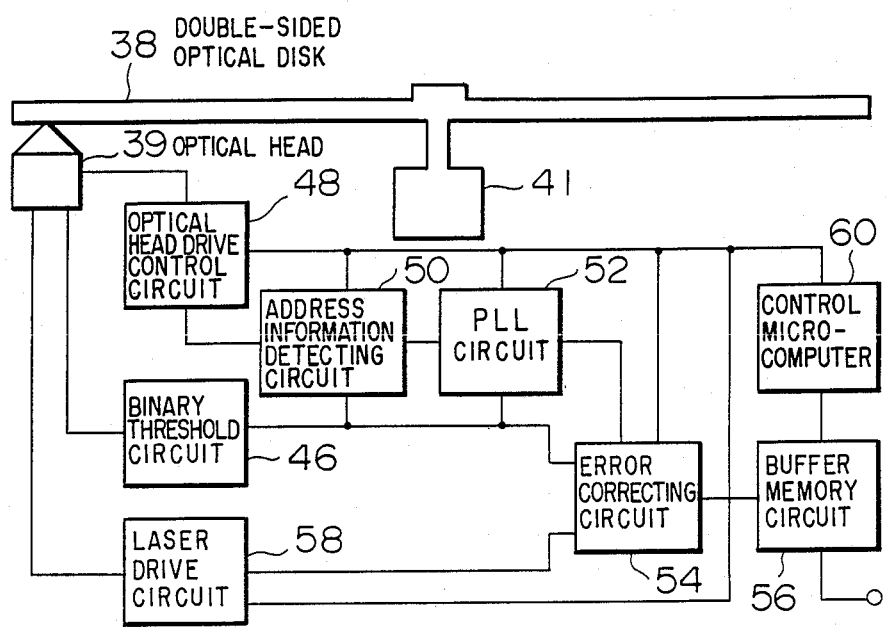
FIG. 10 is a block diagram of the conventional optical information recording disk apparatus.

Next, the sixth embodiment of this invention will be described with reference to the drawings. FIG. 8 shows in block diagram the optical information recording disk apparatus according to the sixth embodiment of this invention. In the figure, shown by 38 is an optical information recording disk, 39 and 40 are optical heads, 41 is a disk spindle motor, 46 and 47 are binary threshold circuits, 48 and 49 are optical head drive control circuits, 50 and 51 are address information detecting circuits, 52 and 53 are PLL circuits, 54 and 55 are error correcting circuits, 56 and 57 are buffer memories, 58 and 59 are laser drive circuits, 60 is a microcomputer, and 61 is distributing-merging (combining) circuit. These are the same components as shown in FIG. 7. Indicated by 62 and 63 are input signal switching circuits, and 64 and 65 are output signal switching circuits. Indicated by 38 is an optical guide groove for the outermost track 0 sector 0 on side 1 of the double-sided optical information recording disk.

The operation of the optical information recording disk apparatus arranged as described above will be explained in connection with FIG. 8.

The optical information recording disk of this embodiment has its number of sectors per track increasing by one at each shift of one track along the way from inner toward outer tracks. It is assumed that image data for a piece of digital picture has a capacity equivalently equal to 28 sectors. In recording the data on the optical information recording disk, it is further assumed that data recording has started on the innermost track of side 1 and the outermost track of side 2 of the optical recording disk, while storing data for the innermost 10 sectors and outermost 18 sectors in the buffer memories and 57, in a period of time when the optical recording disk 38 turns one revolution. Image data of equally equivalent to 28 sectors are written in the buffer memories and 57 in a proportion of quantities of 17 sectors and sectors, respectively, and during the next one revolution of the optical recording disk, data is recorded on the track next to the outermost track and in the sector next to the innermost track, after the output switch circuits 64 and 65 have been reversed. Similarly, the input switch circuits and 63 are also reversed in every second revolution at reproduction. Consequently, the quantity of data entered to the buffer memory circuits 56 and 57 does not exceed the data capacity equivalent to the maximum 28 sectors. Data control is relatively simple.

Although the first, third and fifth embodiments have been described on assumption that the total number of tracks is eight or ten, the track pitch is usually around 1.6 μm and there are almost 1000 tracks having a same number of divisions, and an optical information recording disk has a total number of tracks of the order of ten thousands on one side. Naturally, in case the first information recording sections are provided at every 360 degrees, the number of divisions of track can be increased by one track increment along the way from inner toward outer tracks. Although the address information recording sections are recorded as small pits, it is of course possible to record these sections in any method which allows optical read out. Instead of arranging the address information sections 14 and 15, or 42, 43, 44 and 45, each sector address information may be omitted. Information such as images may have been recorded in the form of small pits or small protrusions at manufacturing of the master disk. Double tracks may be formed so that fast recording and reproduction are possible by dual beam recording, or two pairs of optical heads may be provided to accomplish the same effectiveness. The rotation of the optical information recording disk may be synchronized with the vertical sync signal of the analog image data for the recording and reproduction of video images.

According to this invention, as described above, tracks in the inner and outer portions of an optical information recording disk are combined so that the circumferential sum is constant, or circumferential sum of tracks on both sides of a double-sided optical recording disk is constant, thereby making constant the sum of corresponding sectors on both sides which is set in the MCAV system. Information in batch of certain quantity is recorded on logical tracks, for example, whereby the mass storage capability of the MCAV system and easy information control quality based on track or sector of the CAV system can be realized at the same time. In addition, the fast access performance of the CAV system and fast continuous data transfer at a low disk speed can be realized.

We claim:

1. An optical information recording disk having first information recording sections provided at a constant angular interval on spiral tracks provided separately, equal in number, in an inner circumferential portion and an outer circumferential portion on one side of a disk; partitioned information sections provided by dividing part or all of said first information recording sections, said partitioned information sections having each a length longer than a predetermined length and having a maximum allowable number of divisions per said first information recording section determined depending on the radius of track; and address information sections on said spiral tracks for identifying the location where information is recorded, wherein information is recorded on said spiral tracks in said inner portion from inner to outer tracks, information is recorded on said spiral tracks in said outer portion, having a different spiral direction from that of said tracks in said inner portion, from outer to inner tracks, a series of information is recorded dividedly so that said first information recording sections on a specific track in said inner portion correspond to said first information recording sections on a specific track in said outer portion, and said specific tracks are confined to have such a relation that the sum of numbers of divisions per said first information recording section in said inner portion and said outer portion is equal to the sum of a number of divisions of said first information recording section in the innermost circumference and a number of divisions of the outermost circumference.

2. An optical information recording disk having first information recording sections provided at a constant angular interval on spiral tracks provided equally in number on both sides of a disk; partitioned information sections provided by dividing part or all of said first information recording sections, said partitioned information sections having each a length longer than a predetermined length and having a maximum allowable number of divisions per said first information recording section determined depending on the radius of track; and address information sections on said spiral tracks for identifying the location where information is recorded, wherein information is recorded on said spiral tracks on a first surface of said disk from inner to outer tracks, information is recorded on said spiral tracks on a second surface of disk having a same spiral direction as of said tracks on said first surface of disk from outer to inner tracks, a series of information is recorded dividedly so that said first information recording sections on a specific track on said first surface correspond to said first information recording sections on a specific track on said second surface, and said specific tracks are confined to have such a relation that the sum of numbers of divisions per said first information recording section on said first surface and said second surface is equal to the sum of a number of divisions of said first information recording section in the innermost circumference and a number of divisions of the outermost circumference.

3. An optical information recording disk according to claim 1 further having second information recording sections containing address information recorded at a constant recording density per angle in the form of small pits or protrusions on said spiral tracks, said second information recording sections preceding said first information recording sections.

4. An optical information recording disk according to claim 2 further having second information recording sections containing address information recorded at a constant recording density per angle in the form of small pits or protrusions on said spiral tracks, said second information recording sections preceding said first information recording sections.

5. An optical information recording disk apparatus comprising: an optical information recording disk having address information section on tracks for identifying the location where information is recorded, first information recording sections provided at a constant angular interval on said tracks, and partitioned information sections provided by dividing part or all of said first information recording sections, said partitioned information sections having each a length longer than a predetermined length and having a maximum allowable number of divisions per said first information recording section determined depending on the radius of track; at least one pair of heads for writing or reading information on said optical information recording disk; means for converting information read out of said optical information recording disk into binary information; a buffer memory for storing binary information written or read by said heads; means for rotating said optical information recording disk at a constant angular velocity; means for identifying said address information; and means for recording a constant quantity of information per said partitioned information section, wherein said pair of heads access to different tracks, with a sum of numbers of divisions of said first information recording sections being a constant value, and, at recording, binary information to be recorded in quantity equivalent to said sum of divisions is written into said buffer memory during each certain angular revolution of said disk and, thereafter the binary information is read out of said buffer memory and supplied to said partitioned information sections distributively for said head pair depending on said division number, and, at reproduction, information picked up by said pair of heads is converted into binary information and written in said buffer memory and binary information in quantity equivalent to said sum of division numbers is read out of said buffer memory during said angular revolution of said optical information recording disk.

6. An optical information recording disk apparatus according to claim 5, wherein at recording, at least one pair of switch circuits are provided, which select one of said pair of heads for the binary information output of said pair of buffer memories, said switch circuits being reversed at every angular revolution of said optical information recording disk thereby to select another head, by which binary information is written on said optical information recording disk, and wherein at reproduction, switch circuits are provided, which select one of said pair of heads for the binary information input of said pair of buffer memories, said switch circuits being reversed at every angular revolution of said optical information recording disk thereby to select another head, by which read-out binary information is written in said buffer memories.

* * * * *